(12) United States Patent
Henry et al.

(10) Patent No.: US 12,117,894 B2
(45) Date of Patent: Oct. 15, 2024

(54) THIRD-PARTY SOFTWARE ISOLATION USING AN ACTOR-BASED MODEL

(71) Applicant: Biosero Inc., San Diego, CA (US)

(72) Inventors: Prabhakar Henry, San Diego, CA (US); William Berg, Warner Robins, GA (US); Corey McCoy, Prescott, AZ (US); Lloyd A. Corkan, San Diego, CA (US); Andrew St. Yves, Colchester (GB); Jonathan David Dambman, San Diego, CA (US)

(73) Assignee: Biosero Inc., San Diego, CA (US)

( * ) Notice: Subject to any disclaimer, the term of this patent is extended or adjusted under 35 U.S.C. 154(b) by 416 days.

(21) Appl. No.: 17/651,855

(22) Filed: Feb. 21, 2022

(65) Prior Publication Data

US 2022/0269556 A1 Aug. 25, 2022

Related U.S. Application Data

(63) Continuation of application No. PCT/US2022/070748, filed on Feb. 20, 2022.
(Continued)

(51) Int. Cl.
*G06F 11/00* (2006.01)
*G06F 9/48* (2006.01)
*G06F 11/07* (2006.01)

(52) U.S. Cl.
CPC .......... *G06F 11/0793* (2013.01); *G06F 9/485* (2013.01); *G06F 11/0721* (2013.01); *G06F 2209/481* (2013.01)

(58) Field of Classification Search
CPC ............. G06F 11/0793; G06F 11/0721; G06F 11/327; G06F 11/3013; G06F 11/302; G06F 11/3051
See application file for complete search history.

(56) References Cited

U.S. PATENT DOCUMENTS

| 5,414,845 A | 5/1995 | Behm et al. |
| 9,378,051 B1 | 6/2016 | Wilkes et al. |
| 2012/0304026 A1 | 11/2012 | Khanna et al. |

FOREIGN PATENT DOCUMENTS

CA   3128629 A1 *  7/2016  ............. G06F 16/25

OTHER PUBLICATIONS

WIPO, PCT Form ISA210, International Search Report for International Patent Application Serial No. PCT/US2022/070748, pp. 4 (Jun. 14, 2022).
(Continued)

*Primary Examiner* — Katherine Lin
(74) *Attorney, Agent, or Firm* — UltimatEdge IP Law Group, P.C.; Dean G. Stathakis

(57) ABSTRACT

A software framework for implementation in the performance of automated robotic workflows imparts a hierarchical communications command structure, utilizing an actor-based model to run driver software isolated from scheduling software, by instantiating a message-based abstraction layer that acts as an intermediary between the scheduling software and the third-party driver software. The actor-based model is used within the message-based abstraction layer to isolate the third-party software controlling third party instruments from scheduling software, where such scheduling software and third-party instruments are operating on a common computing platform. This framework prevents scheduling applications from entering an error state, or crashing, where the third-party software component also crashes, and allows the scheduling software to restart the third-party software to continue with the processes controlled by the scheduling software, without interruption to the automated workflow environment.

20 Claims, 3 Drawing Sheets

Related U.S. Application Data

(60) Provisional application No. 63/151,959, filed on Feb. 22, 2021.

(56) References Cited

OTHER PUBLICATIONS

WIPO, PCT Form ISA237, Written Opinion for International Patent Application Serial No. PCT/US2022/070748, pp. 7 (Jun. 14, 2022).

* cited by examiner

THIRD-PARTY SOFTWARE ISOLATION USING AN ACTOR-BASED MODEL

This 35 U.S.C. § 111 patent application claims the benefit of priority and is entitled to the filing date pursuant to 35 U.S.C. § 119(e) of U.S. Provisional Patent Application 63/151,959, filed Feb. 22, 2021, and is a 35 U.S.C. § 111 patent application claims the benefit of priority and is entitled to the filing date pursuant to 35 U.S.C. § 120 of International Patent Application PCT/US2022/070748, filed Feb. 20, 2022, the content of each of which is hereby incorporated by reference in its entirety.

FIELD

The present invention relates to the field of robotics and performance of automated processes. Specifically, the present invention relates to an approach that isolates third-party software used in such automated processes to prevent follow-on control system failure when third-party software crashes or hangs.

BACKGROUND

In the life sciences industry, in order to automate experiments using robotics, scheduling software operates as a workflow engine, and is applied to organize steps in executing complex workflows. Such scheduling software must also integrate third-party instruments, which are typically controlled by their own software (i.e. their own software applications or components), and integration of such instruments is often difficult due to differences in the quality of the software, which can lead to software crashes and unpredictable behavior both at the device level and throughout the workflow environment. Also, many of the software applications or components used by third party instruments may have been developed many years previously and may or may not have been comprehensively updated over time, and further may run on older operating systems, all of which leaves them prone to hacking or virus attacks. Such issues make these third-party instruments, and their software systems, extremely unstable for integration with scheduling software.

In existing systems, driver software for third party instruments and scheduling software for robotics-based workflows typically run within the same process, and on the same computing platform or within the same computing network. In such an operating environment, if the third-party driver software crashes for any reason, then the scheduling software also has a high likelihood of crashing. One existing technique to overcome this problem is to utilize threads to separate the process, but this adds complexity to the overall system at least due to thread locking issues and concurrency.

Further complicating issues in integration of scheduling software and drivers is the approach used for interaction between drivers and the third-party instruments themselves, such as through communication protocols (such as RS-232, TCP/IP, etc.) and other external software, such as Active X controls, DLLs, additional operating software etc. Each third-party instrument and its drivers may utilize different communications and control protocols, such that the scheduling software controlling performance of the automated workflows must also successfully navigate many different systems in addition to handling differences in driver software characteristics, while still maintaining system stability. Still further, the scheduling software and drivers talk using application programming interfaces, or APIs, which are software intermediaries that allow the two applications to interface. The API is in effect the messenger that delivers requests to one application, and then delivers the response back to the other application. APIs are interfaces that are commonly used to bind different applications, and their respective software, yet they lack flexibility in being able to handle the complex nuances in such applications, and do not provide a mechanism for resolving integration issues or mitigating error states.

Therefore, there is a continuing need in the existing art for an approach to isolating third-party software that applies a different driver management process using the same local or common computer, so that scheduling software can withstand crashes in third-party software in a safe and predictable way and without compromising the integrity of robotic processes in automated workflows.

SUMMARY

The present invention provides a novel approach to isolating third party driver software for third party instruments from scheduling software, in the performance of automated, robotic workflows. The approach of the present invention utilizes an actor-based model as a communications structure, to isolate pieces of third-party driver software from scheduling software, and force those isolated pieces of driver software to run on separate, actor-based processes within the same computing platform that runs the scheduling software. This approach has the effect of also isolating the scheduling software from the nuances of the driver software, and prevents it from entering an error state, or crashing, where the third-party software component also crashes. This approach also provides a thread-safe, message-based, and fail-safe mechanism that allows the scheduling software to restart the third-party software to continue with the processes controlled by the scheduling software, without interruption to the automated workflows.

The present invention is a software framework for implementation in the performance of automated robotic workflows that imparts a hierarchical communications command structure utilizing an actor-based model to run driver software isolated from scheduling software, where such scheduling software and third-party instruments are operating on a common computing platform. Implementation of an actor-model to run driver software in this manner enables concurrency and fail-safe mechanisms within common computing platforms, so that when the third-party software crashes due to some reason, the actor-based driver sends a message to the scheduling software and waits for a message to either abort the third-party software process or restart it. The scheduling software therefore continues to run instead of crashing.

The actor model is message-based and runs the third-party ActiveX control software in a separate process, so as to isolate the scheduling software from any processes occurring at the instrument driver level. Also, as explained below, enabling the device driver software to be run as an actor within the actor model system encapsulates control software such as ActiveX, and enables message-based communication with the scheduling software. The software framework therefore instantiates an actor model as the intermediary between the scheduling software and the third-party driver software, and acts as a message-based abstraction layer between the different software systems operating on the computing platform.

Actor models are typically used to implement microservices and distributed applications in cloud computing environments, such as with Microsoft Azure, Amazon Web Services, or with web-based servers generally. But the benefits of using actor models in such environments are also applicable to, and may be realized with regard to, devices operating in a workcell that comprises devices and instruments configured to perform experiments. This is because the third-party software provided by device vendors, particularly in the life sciences and industrial automation industry, is not mature enough, and in addition, there are quality issues which act as a detriment to high performance, high throughput processes.

It is therefore one objective of the present invention to provide systems and methods for improving performance of automated workflows involving one or more robotic processes. It is another objective of the present invention to provide systems and methods of isolating scheduling software from third party software in the performance of such automated workflows. It is another objective of the present invention to provide systems and methods for isolating scheduling software from third party software operating on the same, or a common, computing platform, during the performance of such automated workflows. It is another objective of the present invention to provide systems and methods for isolating scheduling software from device-level third party software by instantiating an actor-based model that acts as a driver supervisor. It is still a further objective of the present invention to provide systems and methods for implementing a workflow engine on a common platform involving different software systems that promotes reliability across the different types of driver software involved in controlling robotic processes in such automated workflows.

It is another objective of the present invention to provide systems and methods for isolating scheduling software from third party software in order to prevent crashes and hangs in third party driver software from affecting performance of the scheduling software and causing a fail state in the entire workflow engine. It is still another objective to provide systems and methods for implementing a message-based environment between scheduling software and third-party driver software, rather than an API-based environment. It is yet a further objective of the present invention to provide systems and methods for replacing API-based connections between applications with an actor model acting as a message-based abstraction or isolation layer.

Other objects, embodiments, features and advantages of the present invention will become apparent from the following description of the embodiments, taken together with the accompanying drawings, which illustrate, by way of example, the principles of the invention.

BRIEF DESCRIPTION OF THE DRAWINGS

The accompanying drawings, which are incorporated in and constitute a part of this specification, illustrate aspects of the disclosed subject matter in at least one of its exemplary embodiments, which are further defined in detail in the following description. Features, elements, and aspects of the disclosure are referenced by numerals with like numerals in different drawings representing the same, equivalent, or similar features, elements, or aspects, in accordance with one or more embodiments. The drawings are not necessarily to scale, emphasis instead being placed upon illustrating the principles herein described and provided by exemplary embodiments of the invention. In such drawings.

DETAILED DESCRIPTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
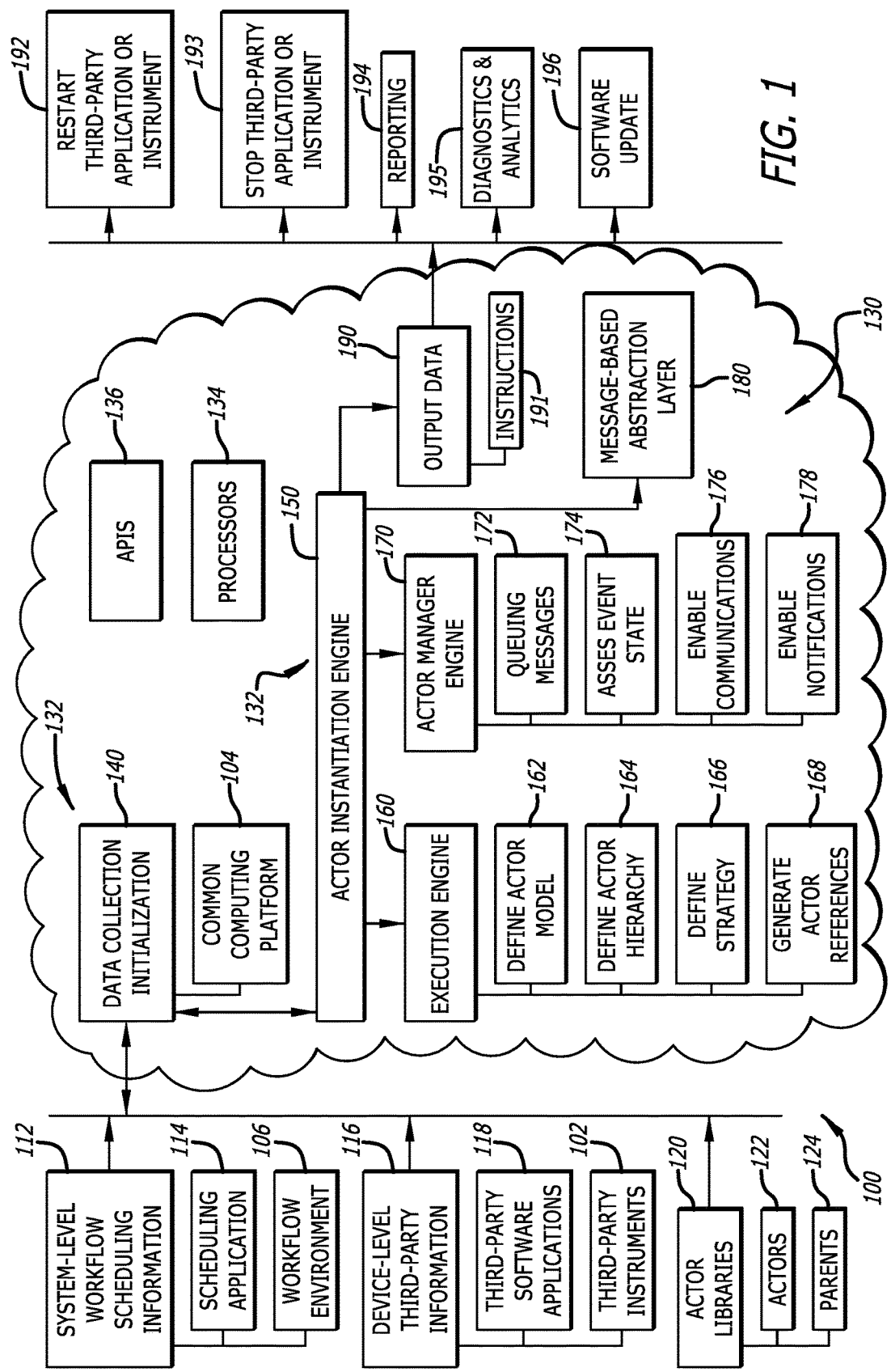
FIG. 1 is a systemic diagram of a software framework for isolating scheduling software from third-party instrument software using an actor-based model, according to one aspect disclosed herein.

FIG. 1 is a system diagram of a framework 100 for a system-level workflow engine, and scheduling software operative therein, from third-party instrument software that controls, or is used by, one or more third-party instruments 102 in the performance of automated workflows using at least one robotic process in a workflow environment 106. Framework 100 is performed within one or more systems and/or methods, that include several processing elements each of which define distinct activities and functions involved in isolating scheduling software from third-party software operating on the same, or a common, computing platform 104, during performance of automated workflows involving multiple tasks and experiments using devices or instruments that operate based on such third-party software.

As noted above, when workflow engine drivers, such as those for workflow scheduling software, communicate with third-party instruments that are using instrument-based, vendor-provided libraries and other such software tools (for example, ActiveX controls), such scheduling software often utilizes method calling via application programming interfaces (APIs) to talk to and control the third-party instrument. In such a method-based, API-calling approach, when the instrument-based, vendor-provided libraries (or any other software associated with the third-party instruments) crash, the scheduling software crashes as well, since both the instrument software and the scheduling software are running in the same process, on either the same local machine or on a common computing platform. Such APIs lack the flexibility to isolate the two software systems, since they only act as a pass-through messenger, rather than as an application that shields the two software systems from each other when crashes occur.

Framework 100 implements an actor-based approach that addresses this problem and allows scheduling software to remain in an operative state where software associated with or utilized by one or more third-party instruments 102 crashes on a common computing platform 104. Such an actor-based approach is message-based, so that it runs the instrument-based and/or vendor-provided software such as ActiveX control software in a separate process, that effects an isolation of the scheduling software. As explained below, this is accomplished by allowing the third-party instrument software to run as an actor within the actor-based system, and thereby encapsulating the third-party instrument software. This enables stable message-based communication between the scheduling software and the third-party instrument software within an overall workflow environment 106.

Figure 2:
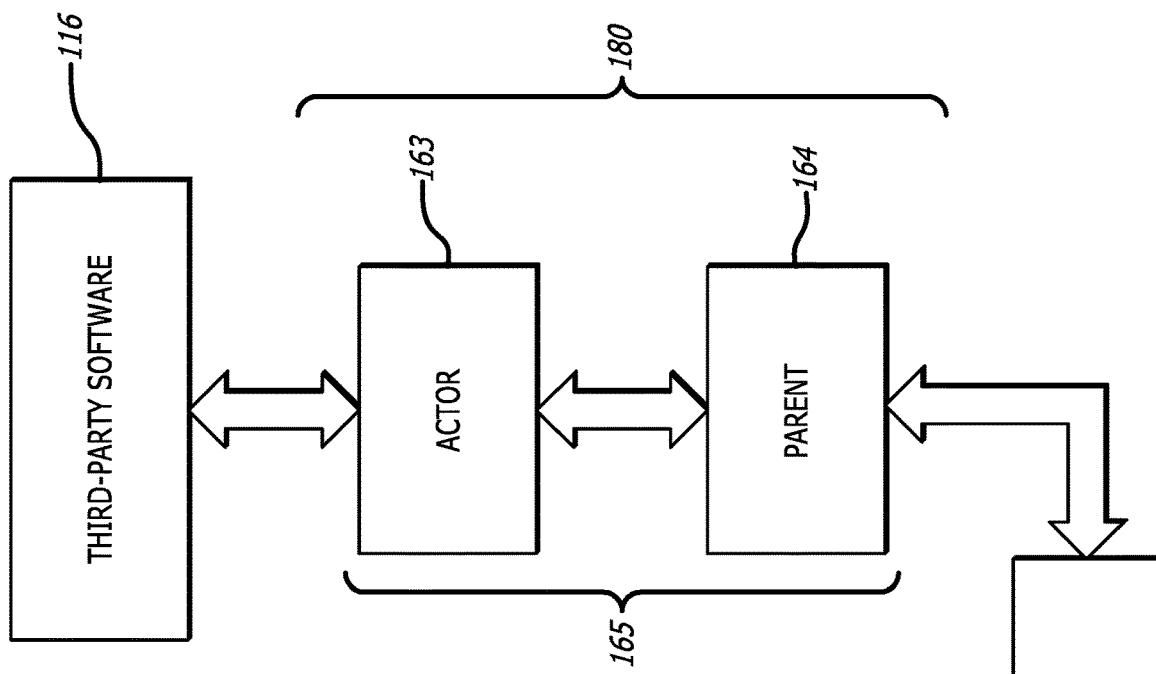
FIG. 2 is a diagram illustrating a high-level use of the software framework of FIG. 1 for isolating scheduling software from third-party instrument software using an actor-based model.
Figure 2:
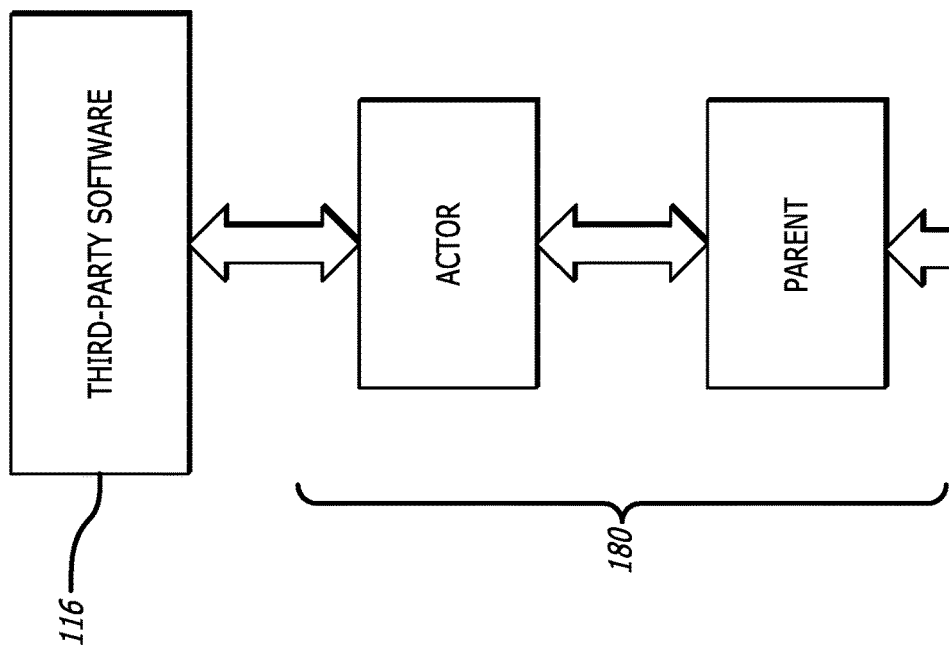

In addition, and as shown in FIG. 2, all actors in an actor-based model 162 are arranged in a hierarchical fashion, with actors 122 at the system level (at a scheduling application 114 in framework 100) at the root or source. This enables supervisory and monitoring functions as described below, so that when a third-party instrument software 118 crashes, the supervisory element handles the exception, sends a message to the scheduling software 114, and implements one of the error handling strategies 166 set forth below for restarting the third-party instrument software 118.

Referring to FIG. 1, framework 100 receives, ingests, requests, or otherwise obtains input data 110 that includes scheduling information 112 representing execution of workflow steps, automated or otherwise, in workflow environment 106, such as for example from one or more scheduling applications 114. Input data 110 also includes device-related information 116 in one or more associated third-party software applications 118, which govern operation of one or more third-party instruments 102 in response to the one or more scheduling applications 114 to execute the workflow steps. The present invention is applicable in an operating environment where, as noted above, the one or more scheduling applications 114 and the one or more associated third-party software applications 118 operate within a common computing platform 104.

Both one or more scheduling applications 114 and one or more associated third-party instrument software applications 118 may take many forms, and include many different types of software. For example, as noted above, each may include ActiveX controls, which are particular software tools used for enabling customized applications within other applications, such as those for gathering data, viewing certain kinds of files, displaying animation, and accessing or providing software libraries. Other examples of software applications for both scheduling applications 114 and associated third-party instrument software applications 118 including device drivers, firmware, middleware, operating systems, and any other type of software application.

Framework 100 is embodied within one or more systems and/or methods that are performed in a plurality of data processing elements 132 that are components within a computing environment 130 that also includes one or more processors 134 and a plurality of software applications and hardware devices or other components. One or more processors 134 and plurality of software applications and hardware devices or other components are configured to execute program instructions or routines to perform the elements, components, modules, algorithms, and data processing functions described herein, and embodied within the plurality of data processing elements 132.

Input data 110 is applied to the plurality of data processing elements 132, which include a data collection and initialization component 140 that is configured to receive, ingest, request, or otherwise obtain input data 110 as noted above, and to prepare framework 100 for application in workflow environment 106. The plurality of data processing elements 132 also include an actor instantiation engine 150, configured to perform functions of both an execution element 160 and an actor manager element 170 to create, implement, and operate a message-based abstraction layer 180, to supervise and monitor actors 122 within an actor hierarchy 164.

Execution element 160 is configured to define an actor model 162, comprised of one or more actors 122, by identifying and selecting appropriate actor functions, and to define an actor hierarchy 164 for actor functions to be created in the actor-based model 162. Execution element 160 may also define a strategy 166 for the supervision and monitoring functions for each actor 163 within the abstraction layer 180. For example, framework 100 may define one or more strategies 166 for handling faults its actors 122 within the actor hierarchy 164, such as error handling strategies 166 for actors 122 in response to an exception state experienced by one or more third-party instruments 102. Such a strategy or strategies 166 may be customized to the needs of a scheduling application 114, workflow environment 106, or both, and may be designed and implemented to address any software integration (or lack of integration) issue experienced in workflow environment 106.

Actor instantiation engine 150 also generates actor references 168 for calling the created actors 122 from one or one more actor libraries 120 for each third-party instrument 102. As part of its function to instantiate the actor-based model 162, the execution element 160 compiles the algorithm or algorithms that together representing the actor-based model 162 representing one or more subordinate actors 122 and supervisory parents 124, where applicable, for each third-party instrument 102 within the common computing platform 104, and configures each actor hierarchy 164 in the actor-based model 162 comprising the message-based abstraction layer 180 for application to workflow environment 106.

Actor instantiation engine 150 further includes, as noted above, an actor manager element 170, which performs a plurality of specific supervisory and monitoring functions within the message-based abstraction layer 180 relative to the state and behavior of each actor 122. These include queueing messages 172 received from each or the one or more scheduling applications 114, and monitoring one or more third-party instruments 102 to which each actor 122 is assigned for assessing an event state 174 and determining whether each of one or more third-party instruments 102 is in an exception state. The actor manager element 170 also enables communications 176 with supervisory parents 124, such as to communicate event state information to parent 124 where a third-party instrument 102 enters an exception state, in a message comprising event state information indicative of an instruction that the associated third-party software application 118 cannot continue. Still further, the actor manager element 170 may also enable one or more notifications 178 from parent 124 as supervisory actor 122 to a scheduling application 114, representing the exception state of a third-party instrument 102, and requesting an instruction to proceed with either a restart 192 or a stop 193 of associated third-party software applications 118 and/or a third-party instrument 102.

Actors generally are software tools that, when applied, operate as containers that enable a higher level of abstraction within concurrent, or parallel, and distributed systems. Actors are typically implemented in a hierarchical manner, in that they form a tree-like structure, with actors serving as parents to actors they've created to increase the level of abstraction. As a parent, an actor is responsible for supervising its children's failures (supervision), so that when an actor crashes, its parent can either restart or stop it, or escalate the failure up the hierarchy of actors, effectively handling the exception state internally within the actor hierarchy. This allows for the implementation of highly fault-tolerant systems generally; in the present invention, it also allows for integration of different systems that communicate using different protocols, in a fault-tolerant manner. The actor-based model 162 therefore enables isolation of each of one or more scheduling applications 114 from third-party instrument applications 118 in workflow environments 106 running common computing platforms 104 for performing workflows, in the context of the present invention.

Actors generally are message-based, in that their purpose is the processing of messages to isolate applications from each other and the protocols used in communicating messages between them. This is the case regardless of whether messages were sent to the actor from other actors (or from outside the actor system). Actors are also capable of performing many different functions in addition to or in conjunction with messaging, such as for example state modeling, behavior modeling, and supervising and monitoring child actors in hierarchical structures. As a state model, actors contain variables that reflect possible states the actor may be in (for example, a counter, set of listeners, or pending requests). As a behavior model, actors define actions to be taken in reaction to messages at particular points in time. Every time a message is processed, its content is compared to a current behavior of the actor; in the example of the present invention, to assess an event state. Because such actions may change over time, change can be accounted for by either encoding them in state variables, or adjusting the function of the actor itself at each instance of instantiating the actor model.

Other types of actors (and associated actor functions) are also possible, and are within the scope of the present invention. For example, routers are special types of actors that route messages to other actors, referred to as routees. Different routers use different strategies to route messages efficiently. Routers may be used inside or outside of an actor, and may be self-contained with configuration capabilities, such as for example to dynamically resize when under a load. It is to be understood, however, that any function of an actor 122 may be implemented in the actor-based model 162 and the strategy 166 within framework 100, and is within the scope of the present invention. Framework 100 is therefore not to be limited to any one specific actor function discussed herein.

Referring to FIG. 1, framework 100 generates output data 190 at least in the form of instructions 191 to actors 122 controlling associated third-party software applications 118 of one or more third-party instruments 102. Such instructions may take many forms. For example, as noted above, output data 190 may be instructions 191 to restart 192 one or more software applications 118 (and/or, restart 192 one or more third party instruments 102) within workflow environment 106. Output data 190 may also be embodied as instructions 191 to stop 193 the one or more software applications 118 (and/or, stop 192 one or more third party instruments 102) within workflow environment 106. In either case of restart instruction 192 or stop instruction 193, each of one or more associated third-party software applications 118 and each of one or more third-party instruments 102 have been successfully isolated from scheduling application 114, such that the scheduling application's performance has not been affected by any exception state experienced by an associated third-party software application 118 or a third-party instrument 102 within the common computing platform 104. Workflow steps controlled at least in part by scheduling application 114 may therefore continue uninterrupted and unmolested within workflow environment 106, due to the use of the actor-based model 162 and message-based abstraction layer 180.

Output data 190 may also be embodied as instructions 191 to perform other functions. Output data 190 may include a reporting function 194, such as for example to generate performance reports related to error states and error handling within workflow environment 106. Output data 190 may also include an analytics and diagnosis function 195, wherein framework 100 analyzes the exception state experienced by an associated third-party software application 118 or a third-party instrument 102, and returns analytical information related to the diagnosis. Analytics generated as output data 190 may also include performance characteristics of the actor-based model 162, such as for example message routing timing and response timing. The output data 190 may further include an update function 196, wherein an instruction 191 is communicated to the associated third-party software application 118 to update itself based on the analyzed exception state in the analytics and diagnosis function 195.

Access to framework 100 of the present invention may be provided through one or more application programming interfaces (APIs) 136 for functions other than facilitating communications between one or more scheduling applications 114 and one or more associated third-party software applications 118. APIs 136 may be provided for particular forms of output data 190, where one or more APIs 136 may be developed to enable functions such as reporting 194 and updating 196 as discussed above. Third parties, for example, may utilize such APIs 136 to develop their own, follow-on uses of the output data 190, such as to generate and export customized reports or alerts, provide updates to one or more associated third-party software applications 118, modify one or more third-party instruments 102, or develop their own enterprise-specific applications.

FIG. 2 is a diagram illustrating an exemplary arrangement 200 in which an abstraction layer 180 representing an actor-based model 162 (not shown) is instantiated for workflow environment 106 according to the teaching presented herein. As shown in FIG. 2, the message-based abstraction layer 180 sits between the scheduling software 114, and associated third-party software applications 118, and is comprised of an actor hierarchy 164 that includes an actor 122 for each third-party instrument 102, and, where applicable, a parent 124 for each actor 122. It is to be noted, however, that a hierarchy 164 may not always include both an actor 122 or a parent 124, and may be comprised only of an actor 122; in addition, a hierarchy 164 may also comprise many subordinate actors 122, and many parents 124, for each associated third-party software application 118. The abstraction layer 180 therefore serves to isolate scheduling application 114 from the associated third-party software applications 118, so that all messaging happens within the actor-based model 162 of framework 100.

Figure 3:
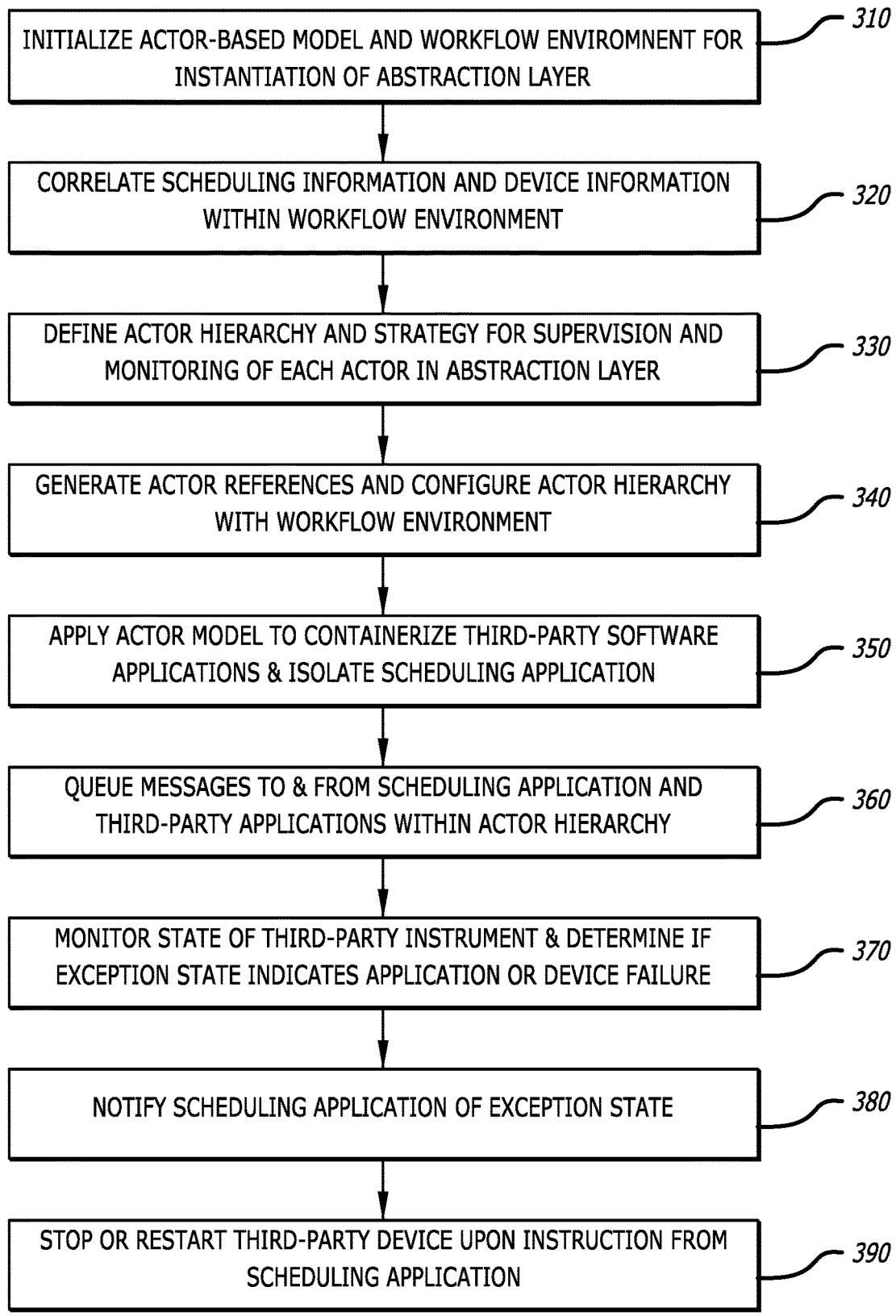
FIG. 3 is a flowchart of steps performed in the process for implementing an actor-based model for isolating scheduling software from third-party instrument software, according to another aspect disclosed herein.

FIG. 3 is a flowchart illustrating steps in an exemplary process 300 for performing framework 100, according to another aspect of the present invention. An actor-based model 162 is initiated and initialized for instantiation as an abstraction layer 180 into workflow environment 106 at step 310. Input data 110 relative to instantiation of the actor-based model 162 and at least comprising scheduling information 112 and device information 116 is correlated for workflow environment 106 at step 320. This is performed to determine and define both an actor hierarchy 164 and a strategy 166 for the supervision and monitoring of each actor 122 in the abstraction layer 180 within framework 100, at step 330.

Process 300 then generates actor references 168, which determine which actor functions to call and compile from actor libraries 120, at step 340. Process 300 then configures the actor-based model 162 according to workflow environment 106 based on the actor references 168. At step 350, process 300 applies the configured actor-based model 162 to containerize associated third-party software applications 118 and isolate scheduling application 114, by separating the associated third-party software applications 118 and scheduling application 114 with the message-based abstraction layer 180, so that the actor-based model 162 acts as both a device software supervisor, and a communications interface, in such an abstraction layer 180.

Abstraction layer 180 operates by queueing messages sent from scheduling application 114 to the associated third-party software applications 118 within the actor hierarchy 164, so that framework 100 replaces more traditional method calling via application programming interfaces (APIs) for talking to and controlling third-party instrument, as step 360. Instead of facilitating messaging between scheduling application 114 and one or more third-party applications 118, framework 100 instead supervises and monitors one or more third party instruments 102 at step 370, for example by communicating messages from actors 122 to each third-party instrument 102, to determine an event state of each of one or more third-party instruments 102 and whether such third-party instruments 102, and/or any of its respective software systems 118, are in an exception or failure state.

If framework 100 determines that a third-party instrument 102 is in an exception state, scheduling application 114 is notified of the exception state through separate messaging independent of messages communicated from the third-party instrument 102 and/or its respective software applications 118, via the actor-based model 162, at step 380. As noted above, this approach replaces API-based calling in which the API is the messenger that delivers requests to one application, and then delivers the response back to the other application. Framework 100 therefore increases flexibility in workflow environments 106 by representing the associated third-party software application 118 within a recursive exception handling structure embodied in the message-based abstraction layer 180, independent of scheduling application 114, to protect scheduling application integrity by providing a mechanism for resolving integration issues or mitigating error states, such as a failure of a third-party instrument 102. Framework 100, through the actor-based model 162 and the abstraction layer 180, therefore acts, in one sense, as a layer of agnostic middleware that shields a scheduling application 114 from associated third-party instrument software applications 118.

At step 390, process 300 facilitates such mitigation by allowing for scheduling application 114 to communicate a stop or restart instruction for each of one or more third-party instruments 102. Framework 100 therefore is able to communicate a stop or restart message via the actor-based model 162 to associated third-party software application 118 associated with each of one or more third-party instruments 102 while maintaining scheduling system operations and preventing an exception state from happening at the system, or scheduling, level due to instrument or software failure at the device level.

It is to be understood that the present invention is not to be limited to any particular type of workflow environment 106, and that framework 100 of the present invention may be applied to any field where automated control of instruments and/or tasks performed by such instruments is desired. For example, workflow environment 106 may be for packaging and shipping, such as where instruments are used to identify an item to be shipped, prepare the item within a package for shipment, and scheduling a shipment of the package. Many types of workflows and workflow environments 106 are therefore possible and are within the scope of the present invention.

The systems and methods of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, GPU and any comparable means. Still further, the present invention may be implemented in cloud-based data processing environments, and where one or more types of servers are used to process large amounts of data, and using processing components such as CPUs, GPUs, TPUs, and other similar hardware. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, machine learning, artificial intelligence, fuzzy logic, expert system or combination of hardware and software that is capable of performing the data processing functionality described herein.

Aspects of the present specification can also be described by the following embodiments:

1. A method, comprising: receiving, as input data, scheduling information from a scheduling application for executing one or more workflow steps in an automated workflow environment, and device-related information from at least one third-party software application governing operation of a third-party instrument in response to the scheduling application to execute the one or more workflow steps, the scheduling application and the at least one third-party software application operating within a common computing platform; integrating the input data in a plurality of data processing elements within a computing environment that includes one or more processors and at least one computer-readable non-transitory storage medium having program instructions stored therein which, when executed by the one or more processors, cause the one or more processors to execute the plurality of data processing elements to implement an actor-based model that represents the at least one third-party software application as a recursive exception handling structure independent of the scheduling application to protect scheduling application integrity, by instantiating a message-based abstraction layer that includes an actor assigned to each third-party software application, to containerize the at least one third-party software application and isolate the scheduling application from each third-party software application within the common computing platform, each actor configured to act as a device software supervisor and communications interface by queueing one or more messages received from the scheduling application, and monitoring an event state of the third-party instrument to which the actor is assigned, and communicating event state information where the third-party instrument enters an exception state, the event state information indicative of an instruction that the at least one third-party software application cannot continue, by generating a notification to the at least one third-party software application representing the exception state of the third-party instrument; and either halting the failed actor, or restarting the failed actor, in response to an instruction from the scheduling application, and a generating a subsequent instruction to the third-party instrument entering the exception state, wherein the message-based abstraction layer replaces direct interface-based method calls in which messages and event state information are communicated between the scheduling application and each third-party software application, so that the at least one third-party software application is responsive only to messages from the actor when the third-party instrument is in the exception state to prevent the at least one third-party software application from crashing due to exception state.

2. The method of embodiment 1, wherein the exception state represents a failure of one or both of the at least one third-party software application and the third-party instrument.

3. The method of embodiment 1 or 2, wherein the at least one third-party software application is at least one of a driver application, a firmware application, a middleware application, or an operating system application.

4. The method of any one of embodiments 1-3, further requesting an instruction from the scheduling application to respond to the exception state.

5. The method of any one of embodiments 1-4, wherein the monitoring an event state of the third-party instrument to which the actor is assigned further comprises communicating messages from each actor to the at least one third-party software application, and receiving responsive messages from the at least one third-party software application by each actor.

6. The method of any one of embodiments 1-5, further comprising restarting the third-party instrument in response to the instruction communicated from the scheduling application after the at least one third-party software application enters a fail state.

7. The method of any one of embodiments 1-6, wherein each actor replaces a component-based object model utilizing one or more application programming interfaces for communication between the scheduling application and the least one third-party software application as a separate process.

8. The method of any one of embodiments 1-7, wherein the scheduling information includes operational data, the operational data including information representing an identification of one or more tasks in performing the one or more workflow steps, and defining the third-party party instrument responsible for performing the one or more tasks.

9. The method of any one of embodiments 1-8, wherein each actor communicates, to the scheduling application, a reference to the actor indicating that the actor has been instantiated for each third-party software application.

10. A system comprising: a data collection module configured to receive input data comprised of scheduling information from a scheduling application for executing one or more workflow steps in an automated workflow environment, and device-related information from at least one third-party software application governing operation of a third-party instrument in response to the scheduling application to execute the one or more workflow steps, the scheduling application and the at least one third-party software application operating within a common computing platform; and an actor instantiation engine configured to implement an actor-based model that represents the at least one third-party software application as a recursive exception handling structure independent of the at least one third-party software application to protect scheduling application integrity, within a message-based abstraction layer instantiated between the scheduling application and the at least one third-party software application, the message-based abstraction layer including an actor assigned to each third-party software application, to containerize the at least one third-party software application and isolate the scheduling application from each third-party software application within the common computing platform, wherein each actor is configured to act as a device software supervisor and communications interface by queuing one or more messages received from the scheduling application, monitoring an event state of the third party instrument to which the actor is assigned, communicating event state information where the third-party instrument enters an exception state, the event state information indicative of an instruction that the at least one third-party software application cannot continue by generating a notification to the scheduling application representing the exception state of the third-party instrument, receiving an instruction to either halt the failed actor, or restart the failed actor, from the scheduling application, and generating a subsequent instruction to the third-party instrument entering the exception state, wherein the message-based abstraction layer replaces direct interface-based method calls in which messages and event state information are communicated between the scheduling application and each third-party software application, so that the third-party software application is responsive only to messages from the actor when the third-party instrument is in the exception state to prevent the scheduling application from crashing due to exception state.

11. The system of embodiment 10, wherein the exception state represents a failure of one or both of the at least one third-party software application and the third-party instrument.

12. The system of embodiment 10 or 11, wherein the at least one third-party software application is at least one of a driver application, a firmware application, a middleware application, or an operating system application.

13. The system of any one of embodiments 10-12, wherein the actor-based model is further configured to request an instruction from the scheduling application to respond to the exception state.

14. The system of any one of embodiments 10-13, wherein the actor-based model is further configured to communicate messages from each actor to the at least one third-party software application, and receiving responsive messages from the at least one third-party software application by each actor.

15. The system of any one of embodiments 10-14, wherein a third-party instrument is restarted in response to the instruction communicated from the scheduling application after the at least one third-party software application enters a fail state.

16. The system of any one of embodiments 10-15, wherein each actor replaces a component-based object model utilizing one or more application programming interfaces for communication between the scheduling application and the least one third-party software application as a separate process.

17. The system of any one of embodiments 10-16, wherein the scheduling information includes operational data, the operational data including information representing an identification of one or more tasks in performing the one or more workflow steps, and defining the third-party party instrument responsible for performing the one or more tasks.

18. The system of any one of embodiments 10-17, wherein each actor communicates, to the scheduling application, a reference to the actor indicating that the actor has been instantiated for each third-party software application.

19. A method of isolating scheduling software from third-party software in an automated workflow environment, comprising: instantiating a message-based abstraction layer between a scheduling application and at least one third-party software application operating within a common computing platform, the at least one third-party software application governing operation of a third-party instrument in response to the scheduling application to execute one or more workflow steps within an automated workflow environment, in an actor-based model that represents the at least one third-party software application as a recursive exception handling structure independent of the scheduling application to protect scheduling application integrity, wherein the actor-based model includes an actor assigned to each third-party software application, and each actor is configured to act as a device software supervisor and communications interface; applying the actor-based model to containerize the at least one third-party software application and isolate the scheduling application from each third-party software application within the common computing platform, by queueing one or more messages received from the scheduling application, and monitoring an event state of the third-party instrument to which the actor is assigned, communicating event state information where the third-party instrument enters an exception state, the event state information indicative of an instruction that the at least one third-party software application cannot continue, by generating a notification to the scheduling application representing the exception state of the third-party instrument; and either halting the failed actor, or restarting the failed actor, based on one or more messages communicated from the scheduling application, and a generating subsequent instruction to the actor assigned to the third-party instrument entering the exception state, wherein the message-based abstraction layer replaces direct interface-based method calls in which messages and event state information are communicated between the scheduling application and each third-party software application, so that the at least one third-party software application is responsive only to messages from the actor when the third-party instrument is in the exception state to prevent the scheduling application from crashing due to exception state.

20. The method of embodiment 19, wherein the scheduling application provides system-level scheduling information for executing the one or more workflow steps in the automated workflow environment, and the one or more third-party software applications provide device-level information related to each third-party instrument in the automated workflow environment.

21. The method of embodiment 19 or 20, wherein the exception state represents a failure of one or both of the at least one third-party software application and the third-party instrument.

22. The method of any one of embodiments 19-21, wherein the at least one third-party software application is at least one of a driver application, a firmware application, a middleware application, or an operating system application.

23. The method of any one of embodiments 19-22, further requesting an instruction from the scheduling application to respond to the exception state.

24. The method of any one of embodiments 19-23, wherein the monitoring an event state of the third-party instrument to which the actor is assigned further comprises communicating messages from each actor to the at least one third-party software application, and receiving responsive messages from the at least one third-party software application by each actor.

25. The method of any one of embodiments 19-24, further comprising restarting the third-party instrument in response to the instruction communicated from the scheduling application after the at least one third-party software application enters a fail state.

26. The method of any one of embodiments 19-25, wherein each actor replaces a component-based object model utilizing one or more application programming interfaces for communication between the scheduling application and the at least one third-party software application as a separate process.

27. The method of any one of embodiments 19-26, wherein the scheduling information includes operational data, the operational data including information representing an identification of one or more tasks in performing the one or more workflow steps, and defining the third-party party instrument responsible for performing the one or more tasks.

28. The method of any one of embodiments 19-27, wherein each actor communicates, to the scheduling application, a reference to the actor indicating that the actor has been instantiated for each third-party software application.

29. A system comprising: at least one third-party instrument governed by an associated third-party software application that acts in response to a scheduling application to execute one or more workflow steps in an automated workflow environment, the scheduling application and the associated third-party software application operating within a common computing platform; and a message-based abstraction layer instantiated between the scheduling application and the associated third-party software application, the message-based abstraction layer having an actor assigned to the associated third-party software application, the actor representing the associated third-party software application as a recursive exception handling structure to containerize the associated third-party software application and isolate the scheduling application from the associated third-party software application within the common computing platform, wherein the actor is configured to act as a device software supervisor and communications interface by queuing one or more messages received from the scheduling application, monitoring an event state of the third party instrument, communicating event state information where the third-party instrument enters an exception state, the event state information indicative of an instruction that the associated third-party software application cannot continue by generating a notification to the scheduling application representing the exception state of the third-party instrument, receiving an instruction to either halt the failed actor, or restart the failed actor, from the scheduling application, and generating a subsequent instruction to the third-party instrument entering the exception state, and wherein the message-based abstraction layer replaces direct interface-based method calls in which messages and event state information are communicated between the scheduling application and the associated third-party software application, so that the associated third-party software application is responsive only to messages from the actor when the third-party instrument is in the exception state to prevent the scheduling application from crashing due to exception state.

30. The system of embodiment 29, wherein the exception state represents a failure of one or both of the associated third-party software application and the third-party instrument.

31. The system of embodiment 29 or 30, wherein the associated third-party software application is at least one of a driver application, a firmware application, a middleware application, or an operating system application.

32. The system of any one of embodiments 29-31, wherein the actor requests an instruction from the scheduling application to respond to the exception state.

33. The system of any one of embodiments 29-32, wherein the actor communicates messages to the associated third-party software application, and receives responsive messages from the associated third-party software application.

34. The system of any one of embodiments 29-33, wherein the third-party instrument is restarted in response to the instruction communicated from the scheduling application after the associated third-party software application enters a fail state.

35. The system of any one of embodiments 29-34, wherein the actor replaces a component-based object model utilizing one or more application programming interfaces for communication between the scheduling application and the associated third-party software application as a separate process.

36. The system of any one of embodiments 29-35, wherein the scheduling application provides scheduling information that includes operational data, the operational data including information representing an identification of one or more tasks in performing the one or more workflow steps, and defining the third-party party instrument responsible for performing the one or more tasks.

37. The system of any one of embodiments 29-36, wherein the actor communicates, to the scheduling application, a reference to the actor indicating that the actor has been instantiated for the associated third-party software application.

In closing, foregoing descriptions of embodiments of the present invention have been presented for the purposes of illustration and description. It is to be understood that, although aspects of the present invention are highlighted by referring to specific embodiments, one skilled in the art will readily appreciate that these described embodiments are only illustrative of the principles comprising the present invention. As such, the specific embodiments are not intended to be exhaustive or to limit the invention to the precise forms disclosed. Therefore, it should be understood that embodiments of the disclosed subject matter are in no way limited to a particular element, compound, composition, component, article, apparatus, methodology, use, protocol, step, and/or limitation described herein, unless expressly stated as such.

In addition, groupings of alternative embodiments, elements, steps and/or limitations of the present invention are not to be construed as limitations. Each such grouping may be referred to and claimed individually or in any combination with other groupings disclosed herein. It is anticipated that one or more alternative embodiments, elements, steps and/or limitations of a grouping may be included in, or deleted from, the grouping for reasons of convenience and/or patentability. When any such inclusion or deletion occurs, the specification is deemed to contain the grouping as modified, thus fulfilling the written description of all Markush groups used in the appended claims.

Furthermore, those of ordinary skill in the art will recognize that certain changes, modifications, permutations, alterations, additions, subtractions and sub-combinations thereof can be made in accordance with the teachings herein without departing from the spirit of the present invention. Furthermore, it is intended that the following appended claims and claims hereafter introduced are interpreted to include all such changes, modifications, permutations, alterations, additions, subtractions and sub-combinations as are within their true spirit and scope. Accordingly, the scope of the present invention is not to be limited to that precisely as shown and described by this specification.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

The words, language, and terminology used in this specification is for the purpose of describing particular embodiments, elements, steps and/or limitations only and is not intended to limit the scope of the present invention, which is defined solely by the claims. In addition, such words, language, and terminology are to be understood not only in the sense of their commonly defined meanings, but to include by special definition in this specification structure, material or acts beyond the scope of the commonly defined meanings. Thus, if an element, step or limitation can be understood in the context of this specification as including more than one meaning, then its use in a claim must be understood as being generic to all possible meanings supported by the specification and by the word itself.

The definitions and meanings of the elements, steps or limitations recited in a claim set forth below are, therefore, defined in this specification to include not only the combination of elements, steps or limitations which are literally set forth, but all equivalent structure, material or acts for performing substantially the same function in substantially the same way to obtain substantially the same result. In this sense it is therefore contemplated that an equivalent substitution of two or more elements, steps or limitations may be made for any one of the elements, steps or limitations in a claim set forth below or that a single element, step or limitation may be substituted for two or more elements, steps or limitations in such a claim. Although elements, steps or limitations may be described above as acting in certain combinations and even initially claimed as such, it is to be expressly understood that one or more elements, steps or limitations from a claimed combination can in some cases be excised from the combination and that the claimed combination may be directed to a sub-combination or variation of a sub-combination. As such, notwithstanding the fact that the elements, steps and/or limitations of a claim are set forth below in a certain combination, it must be expressly understood that the invention includes other combinations of fewer, more or different elements, steps and/or limitations, which are disclosed in above even when not initially claimed in such combinations. Furthermore, insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Accordingly, the claims are thus to be understood to include what is specifically illustrated and described above, what is conceptually equivalent, what can be obviously substituted and also what essentially incorporates the essential idea of the invention.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as, e.g., "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as, e.g., "comprise" and "comprises", and equivalent open-ended transitional phrases thereof like "including," "containing" and "having", encompass all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as, e.g., "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim, whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such, the embodiments described herein or so claimed with the phrase "comprising" expressly and unambiguously provide description, enablement, and support for the phrases "consisting essentially of" and "consisting of."

Lastly, all patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents are based on the information available to the applicant and do not constitute any admission as to the correctness of the dates or contents of these documents.

The invention claimed is:

1. A method, comprising:
receiving, as input data, scheduling information from a scheduling application for executing one or more workflow steps in an automated workflow environment, and device-related information from at least one third-party software application governing operation of a third-party instrument in response to the scheduling application to execute the one or more workflow steps, the scheduling application and the at least one third-party software application operating within a common computing platform;
integrating the input data in a plurality of data processing elements within a computing environment that includes one or more processors and at least one computer-readable non-transitory storage medium having program instructions stored therein which, when executed by the one or more processors, cause the one or more processors to execute the plurality of data processing elements to implement an actor-based model that represents the at least one third-party software application as a recursive exception handling structure independent of the scheduling application to protect scheduling application integrity, by
instantiating a message-based abstraction layer that includes an actor assigned to each third-party software application, to containerize the at least one third-party software application and isolate the scheduling application from each third-party software application within the common computing platform, each actor configured to act as a device software supervisor and communications interface by
queueing one or more messages received from the scheduling application, and monitoring an event state of the third-party instrument to which the actor is assigned, and
communicating event state information where the third-party instrument enters an exception state, the event state information indicative of an instruction that the at least one third-party software application cannot continue, by generating a notification to the at least one third-party software application representing the exception state of the third-party instrument; and
either halting the failed actor, or restarting the failed actor, in response to an instruction from the scheduling application, and a generating a subsequent instruction to the third-party instrument entering the exception state,
wherein the message-based abstraction layer replaces direct interface-based method calls in which messages and event state information are communicated between the scheduling application and each third-party software application, so that the at least one third-party software application is responsive only to messages from the actor when the third-party instrument is in the exception state to prevent the at least one third-party software application from crashing due to exception state.

2. The method of claim 1, wherein the exception state represents a failure of one or both of the at least one third-party software application and the third-party instrument.

3. The method of claim 1, wherein the at least one third-party software application is at least one of a driver application, a firmware application, a middleware application, or an operating system application.

4. The method of claim 1, wherein the monitoring an event state of the third-party instrument to which the actor is assigned further comprises communicating messages from each actor to the at least one third-party software application, and receiving responsive messages from the at least one third-party software application by each actor.

5. The method of claim 1, further comprising restarting the third-party instrument in response to the instruction communicated from the scheduling application after the at least one third-party software application enters a fail state.

6. The method of claim 1, wherein each actor replaces a component-based object model utilizing one or more application programming interfaces for communication between the scheduling application and the least one third-party software application as a separate process.

7. The method of claim 1, wherein the scheduling information includes operational data, the operational data including information representing an identification of one or more tasks in performing the one or more workflow steps, and defining the third-party party instrument responsible for performing the one or more tasks.

8. A system comprising:
one or more processors;
a data collection engine configured to receive input data comprised of scheduling information from a scheduling application for executing one or more workflow steps in an automated workflow environment, and device-related information from at least one third-party software application governing operation of a third-party instrument in response to the scheduling application to execute the one or more workflow steps, the scheduling application and the at least one third-party software application operating within a common computing platform; and an actor instantiation engine configured to implement an actor-based model that represents the at least one third-party software application as a recursive exception handling structure independent of the at least one third-party software application to protect scheduling application integrity, within a message-based abstraction layer instantiated between the scheduling application and the at least one third-party software application, the message-based abstraction layer including an actor assigned to each third-party software application, to containerize the at least one third-party software application and isolate the scheduling application from each third-party software application within the common computing platform, wherein each actor is configured to act as a device software supervisor and communications interface by queuing one or more messages received from the scheduling application, monitoring an event state of the third party instrument to which the actor is assigned, communicating event state information where the third-party instrument enters an exception state, the event state information indicative of an instruction that the at least one third-party software application cannot continue by generating a notification to the scheduling application representing the exception state of the third-party instrument, receiving an instruction to either halt the failed actor, or restart the failed actor, from the scheduling application, and generating a subsequent instruction to the third-party instrument entering the exception state, wherein the message-based abstraction layer replaces direct interface-based method calls in which messages and event state information are communicated between the scheduling application and each third-party software application, so that the third-party software application is responsive only to messages from the actor when the third-party instrument is in the exception state to prevent the scheduling application from crashing due to exception state.

9. The system of claim 8, wherein the exception state represents a failure of one or both of the at least one third-party software application and the third-party instrument.

10. The system of claim 8, wherein the at least one third-party software application is at least one of a driver application, a firmware application, a middleware application, or an operating system application.

11. The system of claim 8, wherein the actor-based model is further configured to communicate messages from each actor to the at least one third-party software application, and receiving responsive messages from the at least one third-party software application by each actor.

12. The system of claim 8, wherein a third-party instrument is restarted in response to the instruction communicated from the scheduling application after the at least one third-party software application enters a fail state.

13. The system of claim 8, wherein each actor replaces a component-based object model utilizing one or more application programming interfaces for communication between the scheduling application and the least one third-party software application as a separate process.

14. A method of isolating scheduling software from third-party software in an automated workflow environment, comprising:

instantiating a message-based abstraction layer between a scheduling application and at least one third-party software application operating within a common computing platform, the at least one third-party software application governing operation of a third-party instrument in response to the scheduling application to execute one or more workflow steps within an automated workflow environment, in an actor-based model that represents the at least one third-party software application as a recursive exception handling structure independent of the scheduling application to protect scheduling application integrity, wherein the actor-based model includes an actor assigned to each third-party software application, and each actor is configured to act as a device software supervisor and communications interface;

applying the actor-based model to containerize the at least one third-party software application and isolate the scheduling application from each third-party software application within the common computing platform, by queueing one or more messages received from the scheduling application, and monitoring an event state of the third-party instrument to which the actor is assigned, communicating event state information where the third-party instrument enters an exception state, the event state information indicative of an instruction that the at least one third-party software application cannot continue, by generating a notification to the scheduling application representing the exception state of the third-party instrument; and either halting the failed actor, or restarting the failed actor, based on one or more messages communicated from the scheduling application, and a generating subsequent instruction to the actor assigned to the third-party instrument entering the exception state, wherein the message-based abstraction layer replaces direct interface-based method calls in which messages and event state information are communicated between the scheduling application and each third-party software application, so that the at least one third-party software application is responsive only to messages from the actor when the third-party instrument is in the exception state to prevent the scheduling application from crashing due to exception state.

15. The method of claim 14, wherein the scheduling application provides system-level scheduling information for executing the one or more workflow steps in the automated workflow environment, and the one or more third-party software applications provide device-level information related to each third-party instrument in the automated workflow environment.

16. The method of claim 14, wherein the exception state represents a failure of one or both of the at least one third-party software application and the third-party instrument.

17. The method of claim 14, wherein the at least one third-party software application is at least one of a driver application, a firmware application, a middleware application, or an operating system application.

18. The method of claim 14, wherein the monitoring an event state of the third-party instrument to which the actor is assigned further comprises communicating messages from each actor to the at least one third-party software application, and receiving responsive messages from the at least one third-party software application by each actor.

19. The method of claim 14, further comprising restarting the third-party instrument in response to the instruction communicated from the scheduling application after the at least one third-party software application enters a fail state.

20. The method of claim 14, wherein each actor replaces a component-based object model utilizing one or more application programming interfaces for communication between the scheduling application and the at least one third-party software application as a separate process.

\* \* \* \* \*